United States Patent
Ramagiri et al.

(10) Patent No.: US 10,698,825 B1
(45) Date of Patent: Jun. 30, 2020

(54) INTER-CHIP COMMUNICATION IN A MULTI-CHIP SYSTEM

(71) Applicant: Arm Limited, Cambridge (GB)

(72) Inventors: Gurunath Ramagiri, Austin, TX (US); Ashok Kumar Tummala, Cedar Park, TX (US); Mark David Werkheiser, Austin, TX (US); Jamshed Jalal, Austin, TX (US); Premkishore Shivakumar, Austin, TX (US); Paul Gilbert Meyer, Rollingwood, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/299,291

(22) Filed: Mar. 12, 2019

(51) Int. Cl.
*G06F 12/00* (2006.01)
*G06F 12/0817* (2016.01)
*G06F 16/901* (2019.01)

(52) U.S. Cl.
CPC ...... *G06F 12/0822* (2013.01); *G06F 16/9017* (2019.01); *G06F 2212/621* (2013.01); *G06F 2212/657* (2013.01)

(58) Field of Classification Search
None
See application file for complete search history.

(56) References Cited

U.S. PATENT DOCUMENTS

| 2014/0032854 | A1* | 1/2014 | Lih | G06F 12/0842 |
| | | | | 711/141 |
| 2017/0255557 | A1* | 9/2017 | Robinson | G06F 12/0811 |

* cited by examiner

*Primary Examiner* — John A Lane
(74) *Attorney, Agent, or Firm* — Nixon & Vanderhye P.C.

(57) ABSTRACT

In a system-on-chip there is a local interconnect to connect local devices on the chip to one another, a gateway to connect the chip to a remote chip of a plurality of chips in a cache-coherent multi-chip system via an inter-chip interconnect, and a cache-coherent device. The cache-coherent device has a cache-coherency look-up table having entries for shared cache data lines. When a data access request is received via the inter-chip interconnect and the local interconnect a system-unique identifier for a request source of the data access request is generated in dependence on an inter-chip request source identifier used on the inter-chip interconnect and an identifier indicative of the remote chip. The bit-set used to express the system-unique identifier is larger than the bit-set used to express the inter-chip request source identifier. The system-unique identifier is used with respect to the cache-coherency look-up table to perform the cache-coherency actions for the cache line enabling more cache coherent devices to be supported.

17 Claims, 10 Drawing Sheets

| LOGICAL IDENTIFIER | CHIP TO WHICH REQUESTING DEVICE BELONGS | SYSTEM-WIDE IDENTIFIER |
|---|---|---|
| 0 | CHIP 0 (LOCAL RNFs) | 0 |
| ... | | ... |
| 47 | | 47 |
| 0 | ACCEL 0 (CXG3) | 48 |
| ... | | ... |
| 15 | | 63 |
| 0 | ACCEL 1 (CXG2) | 64 |
| ... | | ... |
| 15 | | 79 |
| 0 | CHIP 1 (CXG0 AND CXG1) | 80 |
| ... | | ... |
| 47 | | 127 |

| INTER-CHIP REQUEST SOURCE IDENTIFIER | CHIP SPECIFIC LOGICAL IDENTIFIER |
|---|---|
| 0 | 0 |
| . . . | . . . |
| . . . | . . . |
| 63 | 63 |

FIG. 7A

| LOGICAL IDENTIFIER | CHIP TO WHICH REQUESTING DEVICE BELONGS | SYSTEM-WIDE IDENTIFIER |
|---|---|---|
| 0 | CHIP 0 (LOCAL RNFs) | 0 |
| . . . | | . . . |
| 47 | | 47 |
| 0 | ACCEL 0 (CXG3) | 48 |
| . . . | | . . . |
| 15 | | 63 |
| 0 | ACCEL 1 (CXG2) | 64 |
| . . . | | . . . |
| 15 | | 79 |
| 0 | CHIP 1 (CXG0 AND CXG1) | 80 |
| . . . | | . . . |
| 47 | | 127 |

FIG. 7B

| VALID | GATEWAY ID | SYSTEM-WIDE START OFFSET |
|---|---|---|
| 1 | CXG3 NODE ID | 48 |
| 1 | CXG2 NODE ID | 64 |
| 1 | CXG1 NODE ID | 80 |
| 1 | CXG0 NODE ID | 80 |
| 0 | — | 0 |

FIG. 8A

| SYSTEM-WIDE IDENTIFIER | VALID | REMOTE | NODE ID |
|---|---|---|---|
| 0 | 1 | 0 | LOCAL RNF0 NID |
| ... | 1 | 0 | ... |
| 47 | 1 | 0 | LOCAL RNF47 NID |
| 48 | 1 | 1 | CXG3 NID |
| ... | 1 | 1 | CXG3 NID |
| 63 | 1 | 1 | CXG3 NID |
| 64 | 1 | 1 | CXG2 NID |
| ... | 1 | 1 | CXG2 NID |
| 79 | 1 | 1 | CXG2 NID |
| 80 | 1 | 1 | CXG1 NID |
| ... | 1 | 1 | CXG0 NID |
| 127 | 1 | 1 | CXG0 NID |

FIG. 8B

INTER-CHIP COMMUNICATION IN A MULTI-CHIP SYSTEM

TECHNICAL FIELD

The present disclosure relates to data processing systems. In particular, the present disclosure relates to multi-chip data processing systems.

DESCRIPTION

In a data processing system such as a System-on-Chip (SoC) in which multiple processing elements are arranged to carry out data processing operations, caching capability for those multiple processing elements can be provided to improve data access latencies. In this context a cache coherency protocol can be implemented in order to ensure the coherency between the multiple copies of particular data items in the system which can then arise. The complexity of administering such a cache coherency protocol increases further in a multi-chip system, in which processing elements on respective separate individual chips make access to the same shared data and can each cache copies of data items locally, wherein the multiple chips are connected to one another by one or more interconnects in order to provide data transmission capability between the respective chips.

SUMMARY

In one example embodiment described herein there is a system-on-chip comprising:

a local interconnect to connect local devices on the chip to one another;

a gateway to connect the chip to a remote chip of a plurality of chips in a cache-coherent multi-chip system via an inter-chip interconnect; and a cache-coherent device, the cache-coherent device comprising snoop circuitry to perform cache-coherency actions and comprising a cache-coherency look-up table having entries for cache data lines corresponding to shared data items accessed by devices of the cache-coherent multi-chip system, wherein the snoop circuitry is responsive to a data access request received via the inter-chip interconnect and the local interconnect:

to generate a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

to identify a cache line corresponding to a data item specified in the data access request; and to use the system-unique identifier with respect to the cache-coherency look-up table to perform the cache-coherency actions for the cache line.

In one example embodiment described herein there is a method of operating a system-on-chip comprising:

a local interconnect to connect local devices on the chip to one another;

a gateway to connect the chip to a remote chip of a plurality of chips in a cache-coherent multi-chip system via an inter-chip interconnect; and a cache-coherent device, the method comprising:

performing cache-coherency actions with reference to a cache-coherency look-up table having entries for cache data lines corresponding to shared data items accessed by devices of the cache-coherent multi-chip system; and in response to a data access request received via the inter-chip interconnect and the local interconnect:

generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

identifying a cache line corresponding to a data item specified in the data access request; and using the system-unique identifier with respect to the cache-coherency look-up table to perform the cache-coherency actions for the cache line.

In one example embodiment described herein there is a system-on-chip comprising:

local interconnect means for connecting local devices on the chip to one another;

gateway means for connecting the chip to a remote chip of a plurality of chips in a cache-coherent multi-chip system via an inter-chip interconnect;

cache-coherent device means for performing cache-coherency actions with reference to a cache-coherency look-up table having entries for cache data lines corresponding to shared data items accessed by devices of the cache-coherent multi-chip system, wherein the cache coherent device means is responsive to a data access request received via the inter-chip interconnect and the local interconnect to engage:

means for generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

means for identifying a cache line corresponding to a data item specified in the data access request; and means using the system-unique identifier with respect to the cache-coherency look-up table to perform the cache-coherency actions for the cache line.

BRIEF DESCRIPTION OF THE DRAWINGS

The present invention will be described further, by way of example only, with reference to embodiments thereof as illustrated in the accompanying drawings, in which:

FIG. 7A shows a table providing a translation between inter-chip request source identifiers and chip-specific logical identifiers in one example embodiment;

FIG. 7B shows a table providing translation between logical identifiers and system-wide identifiers in one example embodiment;

FIG. 8A is a table showing mappings between gateway identifiers and system-wide offsets in one example embodiment;

FIG. 8B is a table showing translation between system-wide identifiers and local identifiers in one example embodiment;

DESCRIPTION OF EXAMPLE EMBODIMENTS

Figure 1:
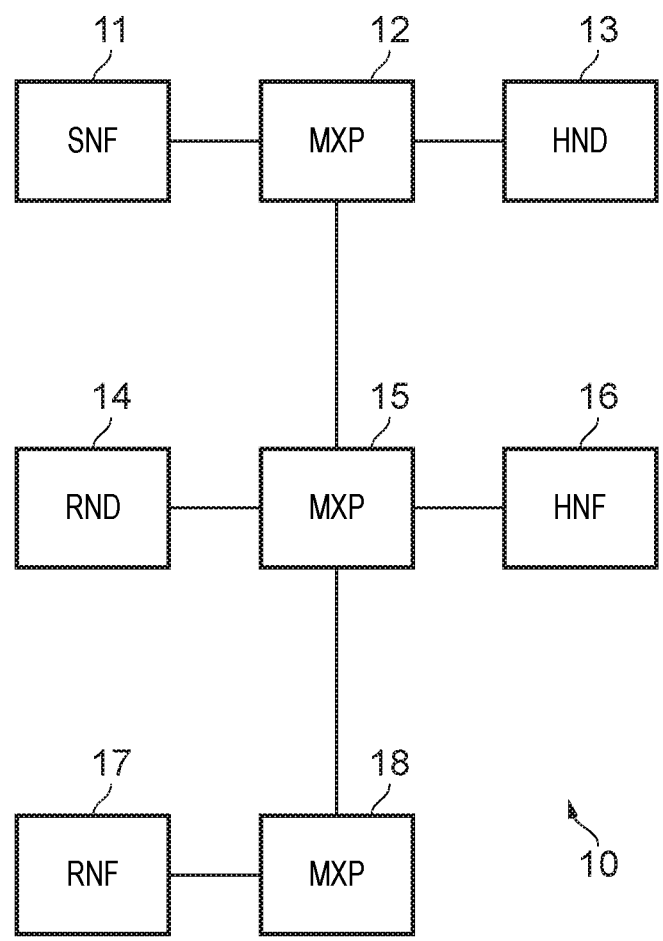
FIG. 1 schematically illustrates a coherent mesh network system in one example embodiment.

Before discussing the embodiments with reference to the accompanying figures, the following description of embodiments is provided.

In accordance with one example configuration there is provided a system-on-chip comprising:

a local interconnect to connect local devices on the chip to one another;

a gateway to connect the chip to a remote chip of a plurality of chips in a cache-coherent multi-chip system via an inter-chip interconnect; and a cache-coherent device, the cache-coherent device comprising snoop circuitry to perform cache-coherency actions and comprising a cache-coherency look-up table having entries for cache data lines corresponding to shared data items accessed by devices of the cache-coherent multi-chip system, wherein the snoop circuitry is responsive to a data access request received via the inter-chip interconnect and the local interconnect:

to generate a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

to identify a cache line corresponding to a data item specified in the data access request; and to use the system-unique identifier with respect to the cache-coherency look-up table to perform the cache-coherency actions for the cache line.

According to the present techniques it has been realised that the configuration of inter-chip request source identifiers used on an inter-chip interconnect which connects the plurality of chips together in a multi-chip system can be a constraint with regard to the efficient implementation of a cache coherency protocol with respect to shared cache lines in the system. In this context the present techniques provide that a cache-coherent device in a system-on-chip of a multi-chip system is arranged to translate an inter-chip request source identifier used on the inter-chip interconnect when a data access request is received. The cache-coherent device translates the inter-chip request source identifier (associated with the data access request to indicate its origin) into a system-unique identifier in dependence on the inter-chip request source identifier and an identifier of the remote chip (where the data access request source is located).

Notably, a bit-set used to express the system-unique identifier is larger than a bit-set used to express the inter-chip request source identifier. In other words, a greater number of unique system-unique identifiers can be expressed than the number of unique inter-chip request source identifiers which can be expressed. The cache-coherent device then uses the system-unique identifier for the purposes of its cache-coherency actions with respect to the relevant cache line and this means that a greater number of shared cache lines can be more efficient managed in the cache-coherency look-up table which tracks those cache lines shared across the multi-chip system.

In some embodiments there may only be one gateway which connects the chip to another remote chip of the plurality of chips, but in some embodiments the at least one chip of the plurality of chips comprises plural gateways to connect the chip to plural remote chips of the plurality of chips via respective plural inter-chip interconnects.

The identifier indicative of the remote chip may be provided in a variety of ways, but in some embodiments the identifier indicative of the remote chip is a gateway indicator indicative of the gateway.

In some embodiments the gateway is responsive to reception of the data access request on the inter-chip interconnect to perform a conversion of the inter-chip request source identifier into a logical device identifier for a corresponding target device of the local devices on the chip. Accordingly, this conversion allows each set of identifiers to be better adapted to the context in which they are used (on the inter-chip interconnect and within the local chip respectively). Greater identifier usage and management efficiency may thereby result.

For example, in some embodiments logical device identifiers for the local devices on the chip form a contiguous set of values. The present techniques recognise that the manner in which the inter-chip request source identifiers are assigned may result in a sparse set of identifiers being used. That is to say, wherein within a set of identifiers which are used valid identifiers are interspersed by invalid (not currently used) identifiers. Accordingly the translation in the gateway from the inter-chip request source identifier into the logical device identifier, where the logical device identifiers form a contiguous set of values, provides the opportunity to compact the identifiers, avoiding such sparseness and to specify the devices referred to more efficiently.

The conversion between inter-chip request source identifiers and logical device identifiers may be arranged in a variety of ways, but in some embodiments the conversion is made with reference to a software programmable logical device lookup table storing correspondences between inter-chip request source identifiers and logical device identifiers. This provides for a flexible manner of defining the correspondences, which can be freely updated by the programmer as required.

The generation of the system-unique identifier to the request source of the data access requests by the snoop circuitry may be performed in a variety of ways. However in some embodiments the snoop circuitry is responsive to the data access request received via the inter-chip interconnect and the local interconnect to generate the system-unique identifier for the request source of the data access request by performing a translation of the identifier indicative of the remote chip into an offset value and adding the offset value to the logical device identifier. This enables an efficient handling of groups of devices on respective remote chips within a single data set.

Further, this translation may be arranged to be carried out in a variety of ways, but in some embodiments the translation is made with reference to a software programmable offset lookup table storing correspondences between identifiers indicative of respective remote chips and respective offset values. This provides for a flexible manner of defining the correspondences, which can be freely updated by the programmer as required.

Remote chips may be specified in a variety of ways in order to allow the snoop circuitry to perform its generation of the system-unique identifier, but in some embodiments the identifier indicative of the remote chip is a gateway indicator indicative of the gateway, and the software programmable offset lookup table stores correspondences between gateway indicators and respective offset values.

In some embodiments the local interconnect is responsive to an outgoing data access request from the cache-coherent device to perform a conversion of a chip-unique device identifier of the cache-coherent device into a logical device identifier for cache-coherent device on the chip.

In some embodiments the gateway is responsive to reception of the outgoing data access request on the local interconnect to perform a conversion of the logical device identifier for cache-coherent device on the chip into an inter-chip request source identifier for the chip.

It should be understood that the snoop circuitry may not only be arranged to monitor incoming data requests and administer the cache coherency protocol with the respect to these, but may also be required to issue snoop requests for certain cache-related actions initiated by the cache-coherent device. In this context, in some embodiments the snoop circuitry is arranged, when issuing a snoop request for the cache-coherency actions with respect to a cache line corresponding to an entry in the cache-coherency look-up table, to convert a system-unique identifier for a target of the snoop request retrieved from the cache-coherency look-up table into a logical device identifier for a target device of the snoop request. The system-unique identifier used within the cache-coherency look-up table can thus be converted into a logical device identifier for the target device of the snoop request and the use of the system-wide identifiers in the cache-coherency look-up table then does not conflict with the use of other protocols used in the system for request propagation.

Such a conversion from a system-unique identifier to a logical device identifier may be arranged to be carried out in a variety of ways, but in some embodiments the snoop circuitry is arranged to convert the system-unique identifier for the target of the snoop request with reference to a mapping table, wherein the mapping table comprises an entry for each system-unique identifier and the entry comprises a remote bit indicative of whether the system-unique identifier corresponds to a local device on the chip or a remote device on a remote chip of the plurality of chips. Accordingly, this approach recognises that target devices of snoop requests which are a local device on the local chip can be usefully distinguished from target devices which are a remote device on a remote chip on the plurality of chips, and the use of a bit within the mapping table to make this distinction provides an efficient mechanism for doing so.

For example, in some embodiments the snoop circuitry is responsive to the remote bit indicating that the system-unique identifier corresponds to a remote device on a remote chip of the plurality of chips to make reference to a software programmable offset lookup table storing correspondences between identifiers indicative of respective remote chips and respective offset values to determine an identifier of the remote chip of the target of the snoop request. The software programmable offset look-up table therefore provides a flexible mechanism for the remote chip of the target of the snoop request to be identified, which can be freely updated by the programmer as required.

The identification of the remote chip may be implemented in a variety of ways, but in some embodiments the identifier indicative of the remote chip is a gateway indicator indicative of a gateway connecting the chip to the remote chip of the target of the snoop request.

In accordance with one example configuration there is provided a method of operating a system-on-chip comprising:

a local interconnect to connect local devices on the chip to one another;

a gateway to connect the chip to a remote chip of a plurality of chips in a cache-coherent multi-chip system via an inter-chip interconnect; and a cache-coherent device, the method comprising:

performing cache-coherency actions with reference to a cache-coherency look-up table having entries for cache data lines corresponding to shared data items accessed by devices of the cache-coherent multi-chip system; and in response to a data access request received via the inter-chip interconnect and the local interconnect:

generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

identifying a cache line corresponding to a data item specified in the data access request; and using the system-unique identifier with respect to the cache-coherency look-up table to perform the cache-coherency actions for the cache line.

In accordance with one example configuration there is provided a system-on-chip comprising:

local interconnect means for connecting local devices on the chip to one another;

gateway means for connecting the chip to a remote chip of a plurality of chips in a cache-coherent multi-chip system via an inter-chip interconnect;

cache-coherent device means for performing cache-coherency actions with reference to a cache-coherency look-up table having entries for cache data lines corresponding to shared data items accessed by devices of the cache-coherent multi-chip system, wherein the cache coherent device means is responsive to a data access request received via the inter-chip interconnect and the local interconnect to engage:

means for generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;

means for identifying a cache line corresponding to a data item specified in the data access request; and means using the system-unique identifier with respect to the cache-coherency look-up table to perform the cache-coherency actions for the cache line.

Particular embodiments will now be described with reference to the figures.

FIG. 1 schematically illustrates an interconnect arrangement in one example embodiment. This example is based on the Coherent Mesh Network (CMN) products provided by Arm Ltd, Cambridge, UK. This scalable mesh network is based on the Arm AMBAS Coherent Hub Interface (CHI) protocol, further supporting multi-chip implementations using Coherent Multi-Link (CML), based on the CCIX (Cache Coherent Interconnect for Accelerators) protocol specifications. The example shown in FIG. 1 consists of a 1×3 mesh topology and comprises various CHI protocol nodes. These CHI protocol nodes are shown as Slave Node SNF 11, home nodes HND 13 and HNF 16, and requesting nodes RND 14 and RNF 17. The mesh cross points MXP 12, MXP 15, and MXP 18 are responsible for routing the protocol packets to the correct node based on a target node ID associated with each packet. According to the CHI specification, the following terminology is used, where the suffix F indicates a fully coherent node (such as a CPU or a coherent GPU), the suffix I indicates an I/O coherent node used to tunnel I/O traffic into CHI based systems, and the suffix D indicates additional support for DVM (Distributed Virtual Memory) traffic. The Home Nodes (HNF and HNI) are responsible for servicing requests from requesting nodes (RNF/RNI/RND). An HNF is responsible for servicing all normal memory requests and an HNI is responsible for I/O requests. Such nodes may contain cache memory and a snoop filter for efficient coherency resolution and hence snoops when required. Slave Nodes (SN) service requests from Home Nodes if they can not be serviced locally in the Home Node itself. A memory controller is an example of a Slave Node. Within the CCIX protocol a requesting node may be referred to as a Requesting Agent (RA), a Home Node may also be referred to as a Home Agent (HA), and a Slave Node may also be referred to as a Slave Agent (SA).

Figure 2:
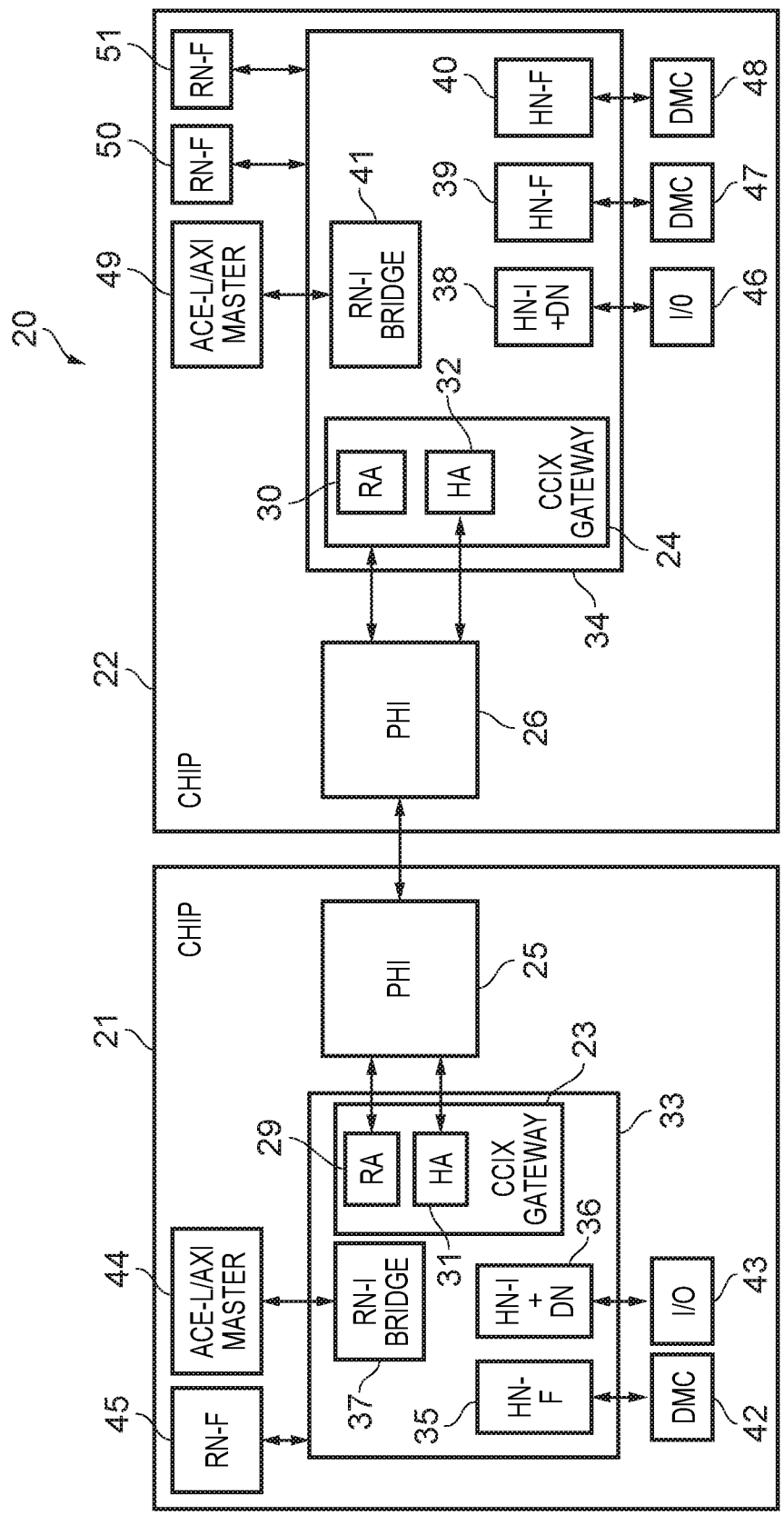
FIG. 2 schematically illustrates a multi-chip system in one example embodiment.

FIG. 2 schematically illustrates a multi-chip system 20 in one example embodiment. The system shown is a CCIX based system containing two CMN chips 21 and 22, which are connected via one or more CCIX links. Each chip comprises a CCIX gateway block 23 and 24 respectively as well as a Physical Interface (PHI) 25 and 26 respectively to interface between the Coherent Hub Interface (CHI) and CXS (CCIX stream) interfaces. The two PHIs are connected to one another. Each CCIX gateway block 23, 24 can be seen to comprise a Requesting Agent (RA) block 29, 30 respectively and a Home Agent (HA) block 31, 32 respectively. Each of the central blocks 33, 34 can be seen in FIG. 2 to comprise various nodes. In the case of block 33, Home Nodes 35 and 36 and Requesting Node 37 are shown. In the case of block 34, Home Nodes 38, 39, 40 and Requesting Node 41 are shown. HN-F 35 provides access to the Dynamic Memory Controller (DMC) 42, HN-I+DN 36 provides access to the I/O 43, and RN-I bridge 37 provides access to the ACE-L/AXI master 44. A further Requesting Node RN-F 45 is also connected. On chip 22 HN-I+DN 38 provides access to the I/O 46, HN-F 39 provides access to the DMC 47, and HN-F 40 provides access to the DMC 48. RN-I bridge 41 provides access to the ACE-L/AXI master 49 and two further requesting nodes RN-F 50 and 51 are also connected.

In the Coherent Mesh Network (CMN) arrangement of each chip, each of the protocol nodes are identified uniquely using node IDs. Similarly, the CCIX system uses six-bit agent IDs to uniquely identify various agents in the CCIX system. These unique IDs are used for routing packets on the interconnect and are also used to uniquely identify the caching agents for snoop filtering tracking.

The inventors of the present techniques have identified that the use of the CCIX specified six-bit agent IDs to identify the various agents in the CCIX system, if this identification system is imported into the cache coherency mechanisms within one of the chips, limits the number of caching masters to 64 (i.e. the number of caching masters that can be uniquely identified by a six-bit requesting agent ID). Furthermore, it is in the nature of these Requesting Agent ID's (RAIDs) and their assignment by diverse devices, that they may be sparsely assigned within that six bit space. As such when they are used in the context of a snoop filter this can lead to an inefficient sizing of the snoop filter (since the filter might have many unused entries). In this context the present techniques propose two types of identifier remapping which can be carried out within a multi-chip system such as that illustrated in FIG. 2. Specifically, the present techniques address the issue by virtualising the identifiers used on the inter-chip interconnect, i.e. the RAIDs in the CCIX-based example of FIG. 2, and remaps them to a larger ID space within the cache-coherent devices (e.g. the Home Nodes (HN-Fs)) and accordingly avoids the limitation of a fixed number of caching agents (64 in the case of the six-bit RAID of CCIX). Moreover, the present techniques propose that this conversion is broken down into two stages, a first stage according to which the identifiers used on the inter-chip interconnect, e.g. RAIDs, are compacted into a per-chip Logical Device ID (LDID). Moreover this repacks into sequential identifiers. Next there is a second stage wherein the per-chip logical IDs (LDIDs) are translated into Global Logical identifiers (GLIDs).

Figure 3:
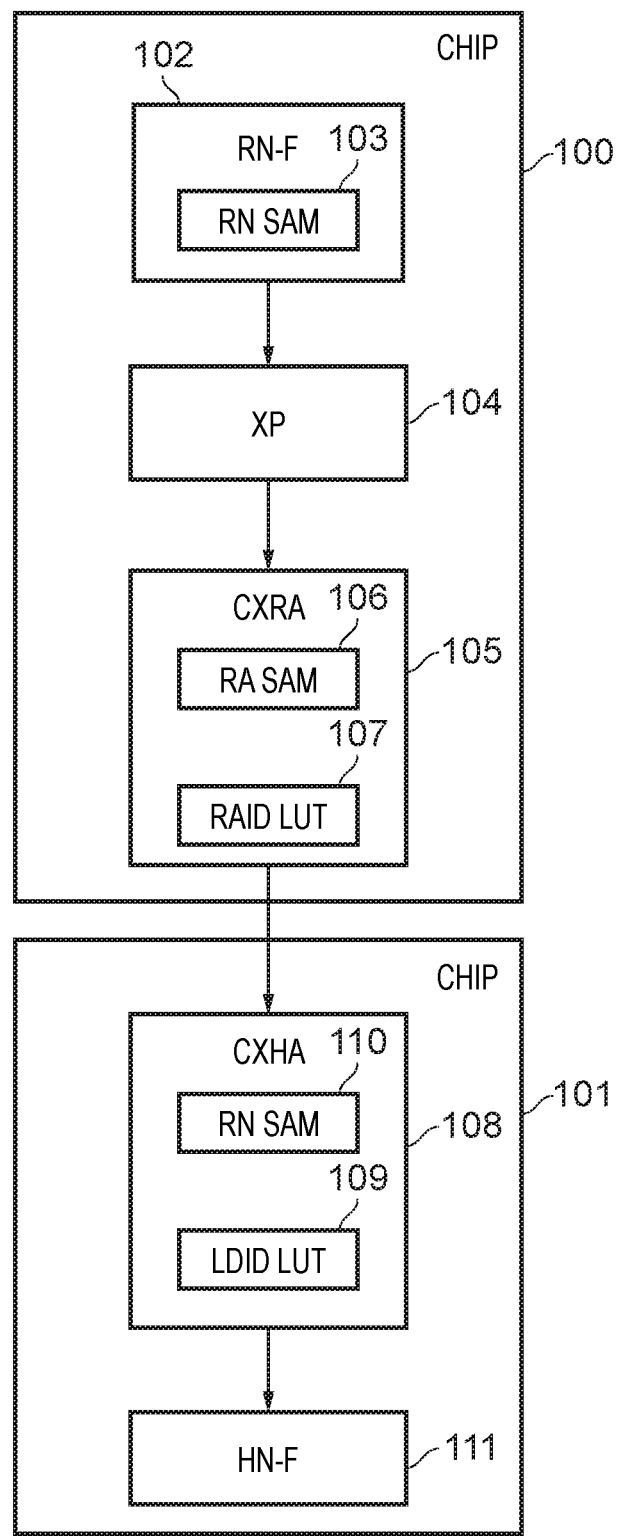
FIG. 3 schematically illustrates a multi-chip system, showing gateways on the periphery of each chip arranged to translate a logical device identifier used in a source chip to an inter-chip request source identifier used between chips in one example embodiment.

FIG. 3 schematically illustrates two chips 100, 101 in order to illustrate the flow of a Coherent Hub Interface (CHI) request from a Requesting Node to a Home Node and the stages of identifier conversion en route. A Requesting Node RN-F 102 within chip 100 is shown to comprise a programmable System Address Map (SAM) 103, which the Requesting Node 102 accesses when issuing a data access request in order to identify a node ID of the CCIX gateway block CRXA 105 which connects this chip to other chips of the multi-chip system. This provides the CHI target ID. The CHI source ID is provided by a node ID of the RN-F 102 (and is constant). The request is transmitted via the Cross Point (XP) 104, which adds a Logical Identifier (LDID) of the RN-F 102 to the request, which is then passed further to the CCIX gateway block CXRA 105. The LDID added by the XP 104 is used by CXRA 105 to access RAID look-up table 107 in order to translate the LDID into a RAID. Further, a Requesting Agent (RA) System Address Map (SAM) 106 is used to get a Home Agent Identifier (HAID) of the target of the request and this is provided as the CCIX target ID. CXRA 105 also adds the CCIX transaction ID given by the CXRA request tracker ID.

CCIX gateway CXRA 105 transmits the request via the inter-chip interconnect to the CCIX gateway CXHA 108 on the chip 101. The CCIX gateway block CXHA 108 then (conversely to the actions of CXRA 105) converts the CCIX RAID identification associated with the request received into local identification. The CXHA 108 comprises a Local Identifier look-up table (LDID LUT) 109 to translate the RAID received into a corresponding Local Identifier LDID. The CHI target ID (local target ID) is provided by reference to an RN system address map (SAM) 110 (this being programmable) and the CHI source ID is provided by a node ID of the CXHA 108 (this being constant). Additionally the CHI transaction ID is provided by the CXHA request tracker ID. The data access request (now converted into CHI formatting) is then passed on the interconnect of the chip 101 to the home node HN-F 111.

Figure 4:
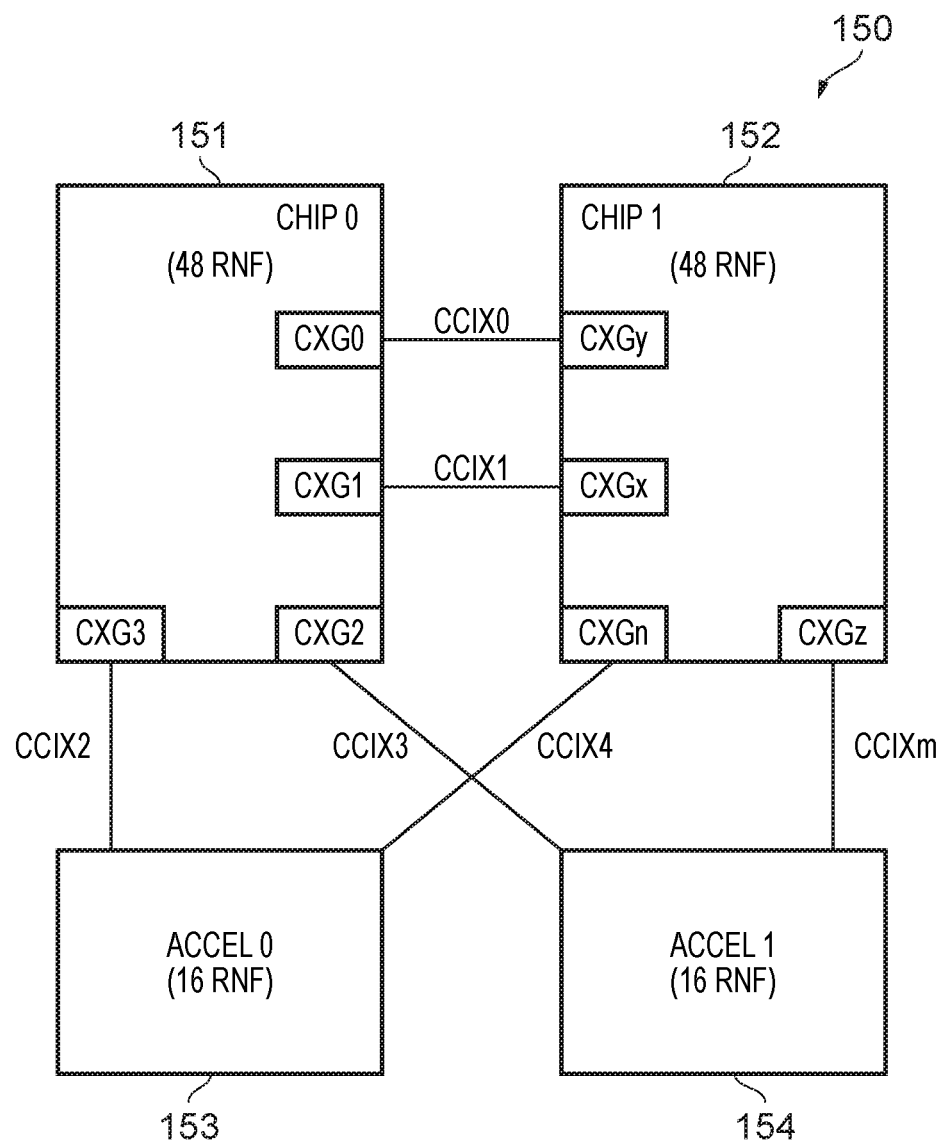
FIG. 4 schematically illustrates a multi-chip system comprising two generic chips and two accelerator chips in one example embodiment.

FIG. 4 schematically illustrates a multi-chip system 150 in one example embodiment. This Coherent Multi-Link (CML) system can be seen to comprise two general purpose chips 151 and 152, as well as two accelerator chips 153 and 154. Inter-chip connectivity is provided by a number of CCIX based interconnects (CCIX0–CCIXm). The interface between each of these CCIX interconnects and the respective chips are provided by a CCIX gateway (CXG), examples of which are only explicitly shown on the general purpose chips 151 and 152. As indicated in the figure, the chips 151 and 152 each have 48 requesting nodes (RNFs) and the accelerator chips 153 and 154 each have 16 requesting nodes (RNFs). Accordingly the example system 150 shown in FIG. 4 has a total of 128 RN-Fs.

Figure 5:
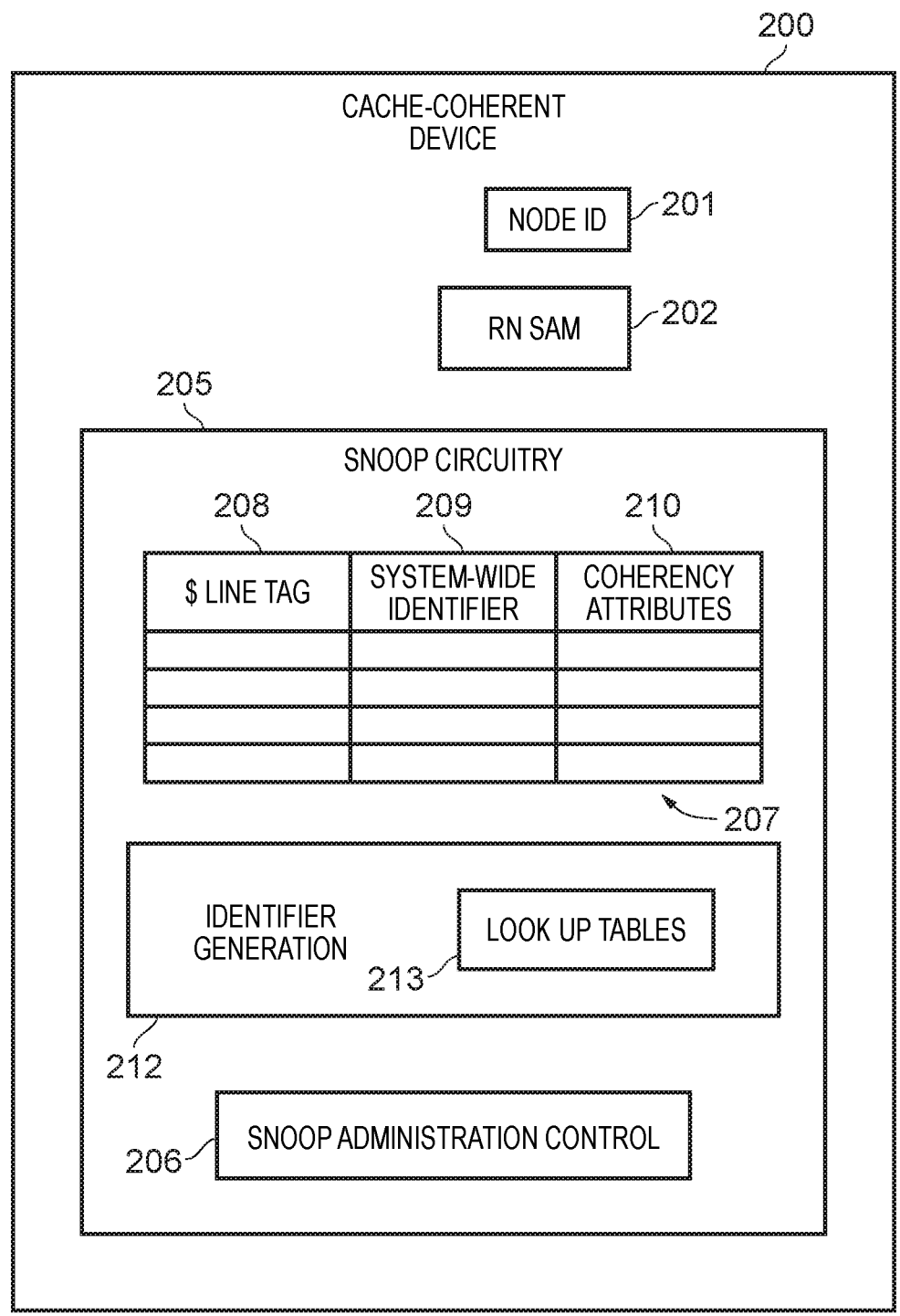
FIG. 5 schematically illustrates a cache-coherent device in one example embodiment.

FIG. 5 schematically illustrates a cache-coherent device 200 in one example embodiment. This cache-coherent device 200 may for example represent any of the coherent devices shown in FIGS. 1 and 2 (i.e. those nodes labelled with the suffix F). The device 200 comprises storage for a node ID 201 and has a programmable system address map 202. As described above with reference to FIG. 3 the node ID 201 enables this cache-coherent device 200 to identify itself when issuing a request to another device in the system and the RN SAM 202 enables the device to identify node IDs of the target device of its requests. The cache-coherent device 200 is further shown to comprise snoop circuitry 205 which, under control of the snoop administration control 206, enables the cache-coherent device to behave in accordance with the cache-coherency protocols of the system. For this purpose the snoop circuitry 205 comprises a cache-coherency look-up table 207 which the snoop administration control 206 references (and updates when required) when carrying out various tasks related to the cache-coherency protocol. The cache-coherency look-up table 207 is shown to be formed of three sets of information, namely the cache line tags 208, the system-wide identifiers 209, and the coherency attributes 210. It should be understood that the system-wide identifiers 209 stored in the look-up table 207 are global for the multi-chip system, that is to say these provide unique identifiers across the entire multi-chip system. With reference to look-up table 207, the snoop administration control 206 can therefore administer the cache-coherency protocols for the system, referring to the coherency attributes 210 as required. The snoop circuitry 205 further comprises identifier generation circuitry 212, which comprises various look-up tables 213, with which translation between different identifier schemes is carried out, as will be discussed below in more detail with reference to FIGS. 7 and 8.

Figure 6A:
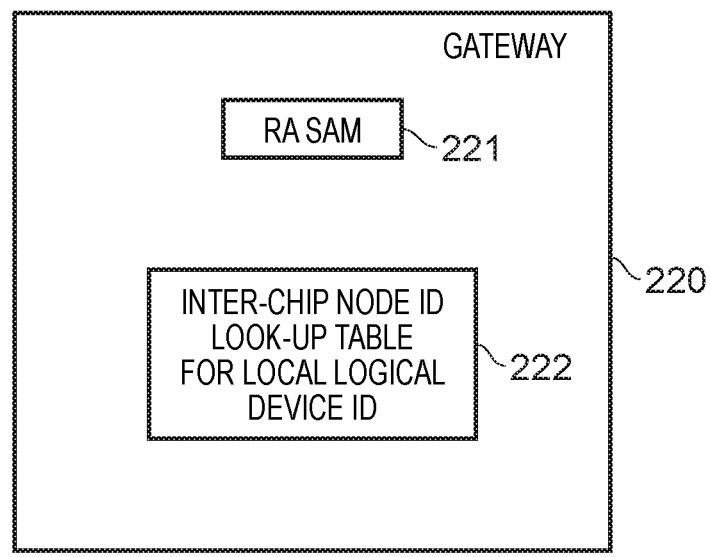
FIG. 6A schematically illustrates a gateway device in one example embodiment.
Figure 6B:
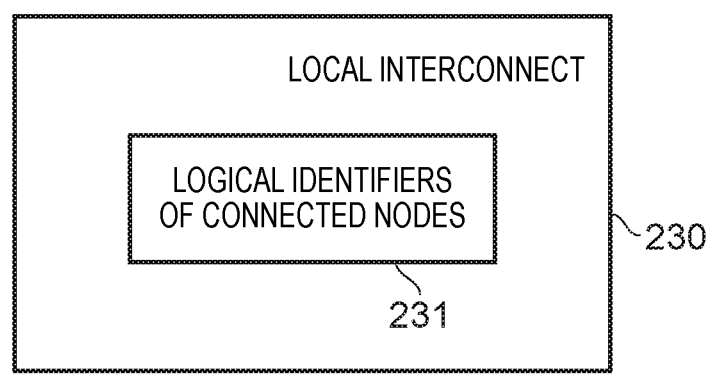
FIG. 6B schematically illustrates a local interconnect in one example embodiment.

FIG. 6A schematically illustrates a gateway 220 in one example embodiment. This may for example represent any of the CXG gateways in the example embodiment of FIG. 4. The gateway 220 is shown to comprise two storage components, namely the requesting agent system address map (RA SAM) 221 and an inter-chip node ID look-up table for local logical device IDs 222. With reference to each of these, the gateway 220 can convert between identifiers. For an outgoing data access request the gateway 220 references the RA SAM 221 in order to determine an identifier used on the inter-chip interconnect (e.g. the CCIX protocol Home Agent Identifier (HAID)) of the request target and the gateway 220 references the look-up table 222 in order to translate a local Logical Device ID (LDID) into an identifier used on the inter-chip interconnect for the request (e.g. the CCIX RAID). Reference in this regard may also be made to FIG. 3 and the description above thereof with respect to the identifier additions and translations which take place in the gateways. FIG. 6B schematically illustrates a local interconnect 230 in one example embodiment. This is shown to comprise storage 231 for logical identifiers of connected nodes. When the local (on chip) interconnect transmits a request, a logical identifier of the source of the request is added by the interconnect. Reference in this regard may also be made to FIG. 3 and the description above thereof with respect to the identifier addition which take place in the Cross Point (XP) 104.

FIG. 7A shows an example look-up table allowing translation between inter-chip request source identifiers (e.g. RAIDs in a CCIX-based system) into per-chip Logical Device Identifiers (LDIDs). Such a table may for example be stored in a gateway, as the table 222 is in the gateway 220 of the example of FIG. 6A. This translation of, for example, RAIDs enables sparsely assigned inter-chip request source identifiers to be compacted into sequentially packed LDIDs. This table, for example as implemented as the Table 222 in the example of FIG. 6A, is software programmable.

FIG. 7B shows a table used in second stage of translation, which may for example be carried out in a cache-coherent device, such the HNF devices in one of the chips of the multi-chip system of FIG. 4. The example table of FIG. 7B is populated with values which apply to a cache-coherent device in chip 151 ("chip 0") in the example of FIG. 4. Here the translation uses the knowledge of the gateways with which chip 151 is connected to the other chips of the multi-chip system and the incoming LDID to generate the system-wide identifier (GLID) for the HN-F to use. Accordingly it can be seen that four sets of (local) logical identifiers are translated into one contiguous set of system-wide identifiers. This translation is achieved using a mapping table such as that shown in FIG. 8A, which enables a gateway ID to be translated into a system-wide start offset for use within the full set of system-wide identifiers. Accordingly when a request arrives at a Home Node (HN-F) the CHI node ID belonging to the gateway (CXG) is checked against the table of FIG. 8A. If the node ID matches any of the programmed valid entries, then the system-wide start offset pointer value is added to the local identifier value to calculate the final system-wide identifier of the request. Hence the system-wide identifier is generated by a system-wide start offset pointer value plus the request logical identifier. This system-wide identifier is thus a system-wide unique ID assigned to each caching agent within the multi-chip system that can be used in the snoop filter (shared cache line table) for tracking usage of a given cache line. Note in particular in the table of FIG. 7B that the range of the system-wide identifiers (0-127) is greater than the range of the logical identifiers (the largest of which is 0-47). The bit-set available for defining the range of the system-wide identifiers is greater than the bit-set available for defining the logical identifiers.

Conversely, for an outgoing request from the cache-coherent device (e.g. HN-F), snoops need to be generated for caching agents that have accessed the same cache line and accordingly the reverse translation is required, i.e. from the system-wide identifier into a local logical identifier based system. Hence as another example of a look-up table 213 in the cache-coherent device of FIG. 5, cache-coherent devices can contain a software programmable table such as that shown in FIG. 8B. Accordingly, when a new snoop request for the device is required, the system-wide identifier (GLID) is converted into a CHI target node ID based on the table of FIG. 8B. The remote bit of this table indicates whether the target node ID is a CXG device (i.e. is associated with a gateway linking to another chip), and if it is then the look-up table of FIG. 8A (which may also be one of the look-up tables 213 in a cache-coherent device in the example of FIG. 5) is used in order to extract the system-wide start offset value. On this basis the system-wide identifier is then converted into a local device identifier by subtracting the system-wide start offset value from the system-wide identifier. Once the snoop request arrives at the relevant C×G block (if it is destined for another chip) then there the LDID is converted to a inter-chip identifier (e.g. RAID) based on the look-up table given in the example of FIG. 7A.

Figure 9:
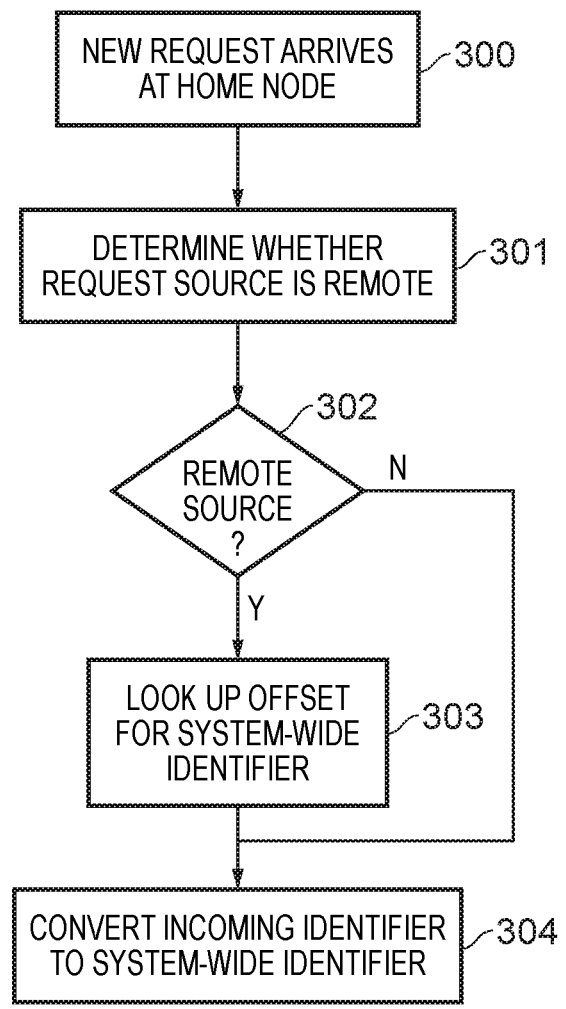
FIG. 9 is a flow diagram showing a sequence of steps which are taken according to the method of one example embodiment.

FIG. 9 is a flow diagram showing a sequence of steps taken according to the method of one example embodiment. The flow begins at step 300, where a new request arrives at a cache-coherent device (home node). It is firstly determined at step 301, whether the request source is remote. On the basis of this determination then from step 302 different paths are taken. If the source of the request is remote, then at step 303 an offset for the system-wide identifier is determined from a look-up table (such as that illustrated in FIG. 8A) at step 303. Otherwise (for a non-remote request) from step 302 the flow proceeds directly to step 304. At step 304 the incoming identifier is converted into a system-wide identifier (as described above).

Figure 10:
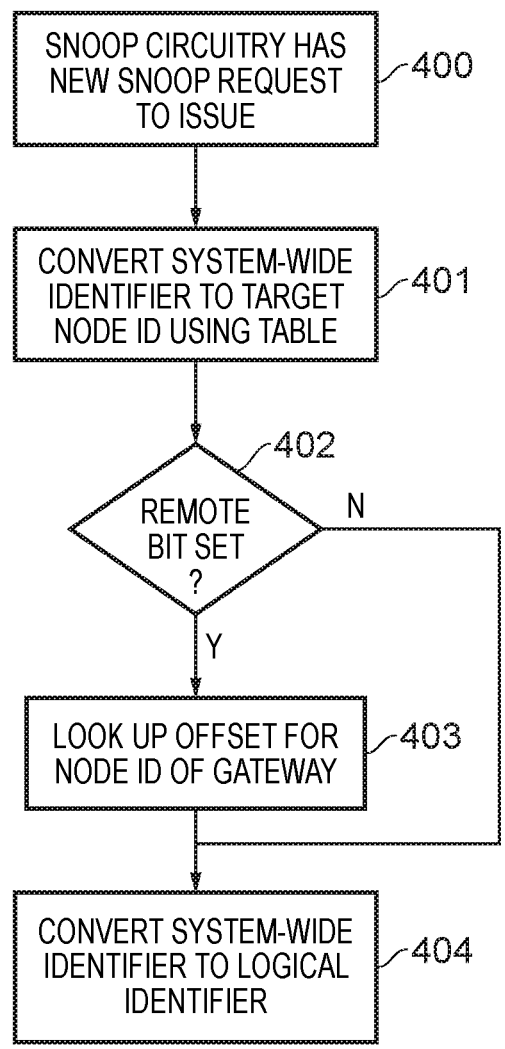
FIG. 10 is a flow diagram showing a sequence of steps which are taken according to the method of one example embodiment.

FIG. 10 is a flow diagram showing a sequence of steps which are taken according to the method of one example embodiment. Here the steps taken correspond to a procedure when a snoop request needs to be issued from a cache-coherent device. The flow begins at step 400, where the snoop circuitry of the device has a new snoop request to issue. At step 401 the system-wide identifier used in the snoop filter of the device is used to determine a target node ID using a stored table (such as that shown in FIG. 8B). It is then determined at step 402 if the remote bit, indicating that the target of the snoop request is on another chip, is set in the table entry. If it is then the flow proceeds via step 402 where an offset for the node ID of the gateway is looked-up in a reference table (such as that shown in the example of FIG. 8A). Then at step 404 the system-wide identifier is converted into a logical (local) identifier, subtracting the offset (if such exists) as described above.

In brief overall summary a cache-coherent multi-chip system comprising a plurality of chips is disclosed. On at least one chip there is a local interconnect to connect local devices on the chip to one another, a gateway to connect the chip to a remote chip of the plurality of chips via an inter-chip interconnect, and a cache-coherent device. The cache-coherent device has a cache-coherency look-up table having entries for shared cache data lines. When a data access request is received via the inter-chip interconnect and the local interconnect a system-unique identifier for a request source of the data access request is generated in dependence on an inter-chip request source identifier used on the inter-chip interconnect and an identifier indicative of the remote chip. The bit-set used to express the system-unique identifier is larger than the bit-set used to express the inter-chip request source identifier. The system-unique identifier is used with respect to the cache-coherency look-up table to perform the cache-coherency actions for the cache line enabling more cache coherent devices to be supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A system-on-chip comprising:
a local interconnect to connect local devices on the chip to one another;
a gateway to connect the chip to a remote chip of a plurality of chips in a cache-coherent multi-chip system via an inter-chip interconnect; and
a cache-coherent device, the cache-coherent device comprising snoop circuitry to perform cache-coherency actions and comprising a cache-coherency look-up table having entries for cache data lines corresponding to shared data items accessed by devices of the cache-coherent multi-chip system, wherein the snoop circuitry is responsive to a data access request received via the inter-chip interconnect and the local interconnect:
to generate a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;
to identify a cache line corresponding to a data item specified in the data access request; and
to use the system-unique identifier with respect to the cache-coherency look-up table to perform the cache-coherency actions for the cache line.

2. The system-on-chip of claim 1, wherein the at least one chip of the plurality of chips comprises plural gateways to connect the chip to plural remote chips of the plurality of chips via respective plural inter-chip interconnects.

3. The system-on-chip of claim 2, wherein the identifier indicative of the remote chip is a gateway indicator indicative of the gateway.

4. The system-on-chip of claim 1, wherein the gateway is responsive to reception of the data access request on the inter-chip interconnect to perform a conversion of the inter-chip request source identifier into a logical device identifier for a corresponding target device of the local devices on the chip.

5. The system-on-chip of claim 4, wherein logical device identifiers for the local devices on the chip form a contiguous set of values.

6. The system-on-chip of claim 5, wherein the snoop circuitry is responsive to the data access request received via the inter-chip interconnect and the local interconnect to generate the system-unique identifier for the request source of the data access request by performing a translation of the identifier indicative of the remote chip into an offset value and adding the offset value to the logical device identifier.

7. The system-on-chip of claim 6, wherein the translation is made with reference to a software programmable offset lookup table storing correspondences between identifiers indicative of respective remote chips and respective offset values.

8. The system-on-chip of claim 7, wherein the identifier indicative of the remote chip is a gateway indicator indicative of the gateway, and the software programmable offset lookup table stores correspondences between gateway indicators and respective offset values.

9. The cache-coherent multi-chip system of claim 4, wherein the conversion is made with reference to a software programmable logical device lookup table storing correspondences between inter-chip request source identifiers and logical device identifiers.

10. The system-on-chip of claim 1, wherein the local interconnect is responsive to an outgoing data access request from the cache-coherent device to perform a conversion of a chip-unique device identifier of the cache-coherent device into a logical device identifier for cache-coherent device on the chip.

11. The system-on-chip of claim 10, wherein the gateway is responsive to reception of the outgoing data access request on the local interconnect to perform a conversion of the logical device identifier for cache-coherent device on the chip into an inter-chip request source identifier for the chip.

12. The system-on-chip of claim 1, wherein the snoop circuitry is arranged, when issuing a snoop request for the cache-coherency actions with respect to a cache line corresponding to an entry in the cache-coherency look-up table, to convert a system-unique identifier for a target of the snoop request retrieved from the cache-coherency look-up table into a logical device identifier for a target device of the snoop request.

13. The system-on-chip of claim 12, wherein the snoop circuitry is arranged to convert the system-unique identifier for the target of the snoop request with reference to a mapping table, wherein the mapping table comprises an entry for each system-unique identifier and the entry comprises a remote bit indicative of whether the system-unique identifier corresponds to a local device on the chip or a remote device on a remote chip of the plurality of chips.

14. The system-on-chip of claim 13, wherein the snoop circuitry is responsive to the remote bit indicating that the system-unique identifier corresponds to a remote device on a remote chip of the plurality of chips to make reference to a software programmable offset lookup table storing correspondences between identifiers indicative of respective remote chips and respective offset values to determine an identifier of the remote chip of the target of the snoop request.

15. The system-on-chip of claim 14, wherein the identifier indicative of the remote chip is a gateway indicator indicative of a gateway connecting the chip to the remote chip of the target of the snoop request.

16. A method of operating a system-on-chip comprising:
a local interconnect to connect local devices on the chip to one another;
a gateway to connect the chip to a remote chip of a plurality of chips in a cache-coherent multi-chip system via an inter-chip interconnect; and
a cache-coherent device, the method comprising:
performing cache-coherency actions with reference to a cache-coherency look-up table having entries for cache data lines corresponding to shared data items accessed by devices of the cache-coherent multi-chip system; and
in response to a data access request received via the inter-chip interconnect and the local interconnect:
generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;
identifying a cache line corresponding to a data item specified in the data access request; and
using the system-unique identifier with respect to the cache-coherency look-up table to perform the cache-coherency actions for the cache line.

17. A system-on-chip comprising:
local interconnect means for connecting local devices on the chip to one another;
gateway means for connecting the chip to a remote chip of a plurality of chips in a cache-coherent multi-chip system via an inter-chip interconnect;
cache-coherent device means for performing cache-coherency actions with reference to a cache-coherency look-up table having entries for cache data lines corresponding to shared data items accessed by devices of the cache-coherent multi-chip system,
wherein the cache coherent device means is responsive to a data access request received via the inter-chip interconnect and the local interconnect to engage:
means for generating a system-unique identifier for a request source of the data access request in dependence on an inter-chip request source identifier used on the inter-chip interconnect and an identifier indicative of the remote chip, wherein a bit-set used to express the system-unique identifier is larger than a bit-set used to express the inter-chip request source identifier;
means for identifying a cache line corresponding to a data item specified in the data access request; and
means using the system-unique identifier with respect to the cache-coherency look-up table to perform the cache-coherency actions for the cache line.

* * * * *